(12) United States Patent
Rooney (10) Patent No.: US 11,991,988 B2
(45) Date of Patent: May 28, 2024

(54) PET TRAINING HARNESS

(71) Applicant: Andrew J. Rooney, Cullowhee, NC (US)

(72) Inventor: Andrew J. Rooney, Cullowhee, NC (US)

(*) Notice: Subject to any disclaimer, the term of this patent is extended or adjusted under 35 U.S.C. 154(b) by 72 days.

(21) Appl. No.: 17/189,055

(22) Filed: Mar. 1, 2021

(65) Prior Publication Data

US 2021/0307295 A1  Oct. 7, 2021

Related U.S. Application Data

(60) Provisional application No. 63/003,652, filed on Apr. 1, 2020.

(51) Int. Cl.
   *A01K 27/00* (2006.01)

(52) U.S. Cl.
   CPC .................................. *A01K 27/002* (2013.01)

(58) Field of Classification Search
   CPC ..................................................... A01K 27/002
   See application file for complete search history.

(56) References Cited

U.S. PATENT DOCUMENTS

| | | | |
|---|---|---|---|
| 1,685,435 A | | 9/1928 | Philbrick |
| 4,964,369 A | | 10/1990 | Sporn |
| D312,151 S | | 11/1990 | Dickey |
| 5,325,819 A | | 7/1994 | Krauss |
| 5,660,146 A | * | 8/1997 | Sporn .................. A01K 27/002 |
| | | | 119/792 |
| 5,934,224 A | * | 8/1999 | Sporn .................. A01K 27/002 |
| | | | 119/792 |
| 6,085,694 A | * | 7/2000 | Simon .................. A01K 27/002 |
| | | | 119/797 |
| 6,450,130 B1 | * | 9/2002 | Goldberg ............. A01K 1/0263 |
| | | | 119/856 |
| 7,004,113 B1 | | 2/2006 | Zutis et al. |

(Continued)

FOREIGN PATENT DOCUMENTS

| | | |
|---|---|---|
| DE | 19733287 | 4/1998 |
| DE | 102012000524 | 7/2013 |

(Continued)

OTHER PUBLICATIONS

Petexpertise; Article entitled: "Halti Harness No Pull Harness, Multi functional and with Padding", located at <https://www.petexpertise.com/halti-front-attachment-no-pull-harness/>, accessed on Apr. 10, 2020, 4 pgs.

(Continued)

*Primary Examiner* — Monica L Perry
*Assistant Examiner* — Alanna K Peterson
(74) *Attorney, Agent, or Firm* — Taylor English Duma LLP (57) ABSTRACT

A harness assembly can include a harness including a guide; and a control line extending through the guide, the control line capable of translating through the guide relative to the harness. A pet training assembly can include a harness assembly including a harness including a guide; and a control line extending through the guide, the control line capable of translating through the guide relative to the harness, the control line defining a first end and a second end; a collar coupled to the first end; and a leash coupled to the second end.

23 Claims, 13 Drawing Sheets

(56) References Cited

U.S. PATENT DOCUMENTS

| | | | |
|---|---|---|---|
| 7,343,881 B2 * | 3/2008 | Schantz | A01K 27/002 119/856 |
| D584,862 S | 1/2009 | Kemper | |
| D621,561 S * | 8/2010 | Siklosi | D30/153 |
| D633,257 S | 2/2011 | Trias | |
| 8,051,808 B2 | 11/2011 | Mugford | |
| D688,011 S | 8/2013 | Gee | |
| 8,516,978 B2 | 8/2013 | Horiuchi | |
| 8,561,577 B1 * | 10/2013 | Paxton | A01K 27/002 119/856 |
| D701,356 S | 3/2014 | Troll | |
| 9,301,505 B1 * | 4/2016 | Luna | A01K 27/003 |
| 9,301,506 B2 * | 4/2016 | Roney, III | A01K 27/002 |
| 9,485,965 B2 | 11/2016 | Bentley et al. | |
| D823,558 S | 7/2018 | Fitzpatrick | |
| D843,667 S | 3/2019 | Eida et al. | |
| D883,581 S | 5/2020 | Daly et al. | |
| D893,812 S | 8/2020 | Wu | |
| D893,813 S | 8/2020 | Zimmermann | |
| D896,449 S | 9/2020 | Dang | |
| D900,413 S | 10/2020 | Gonzalez | |
| D911,631 S | 2/2021 | Stouder et al. | |
| D915,002 S | 3/2021 | Sebo | |
| D918,493 S | 5/2021 | Chang | |
| 11,102,958 B1 | 8/2021 | Chang et al. | |
| D936,300 S | 11/2021 | Wu | |
| D940,408 S | 1/2022 | Sebo | |
| D952,269 S | 5/2022 | Chang | |
| 11,324,201 B1 | 5/2022 | Benishai et al. | |
| D957,752 S | 7/2022 | Ohanian | |
| D957,753 S | 7/2022 | Akiyama | |
| D957,754 S | 7/2022 | Chang | |
| D964,664 S | 9/2022 | Huang | |
| D965,234 S | 9/2022 | Wang | |
| D965,235 S | 9/2022 | Jin | |
| 11,432,533 B2 | 9/2022 | Kruse et al. | |
| D965,922 S | 10/2022 | Wang et al. | |
| D979,160 S | 2/2023 | Rooney | |
| 2013/0128556 A1 | 5/2013 | Brauser et al. | |
| 2014/0202397 A1 * | 7/2014 | Bentley | A01K 27/002 119/863 |
| 2015/0114311 A1 | 4/2015 | Lynch | |
| 2019/0269101 A1 | 9/2019 | Vesley | |
| 2021/0244001 A1 * | 8/2021 | Park | A01K 27/003 |
| 2022/0201982 A1 | 6/2022 | Elam | |

FOREIGN PATENT DOCUMENTS

| | | |
|---|---|---|
| EP | 0555588 | 8/1993 |
| FR | 2908267 | 5/2008 |
| KR | 300889341 | 1/2017 |
| KR | 20180102519 | 9/2018 |
| KR | 3020200039525 | 7/2021 |

OTHER PUBLICATIONS

Rakuten, Inc.; Article entitled: "The choice of the pulling prevention lead!", publicly available prior to Apr. 1, 2020, 1 pg.

Amazon.com; Article entitled: KONG Control Training Harness (Medium), located at <https://www.amazon.com/KONG-Control-Training-Harness-Medium/dp/B06XC6962W>, accessed on Apr. 10, 2020, 5 pgs.

Rooney, Andrew J.; Non-Final Office Action for U.S. Appl. No. 29/774,174, filed Mar. 15, 2021, dated Jun. 21, 2022, 18 pgs.

Voyager Step-In Air Dog Harness, available in Amazon.com, date first available Jul. 22, 2014 [online], [site visited Jun. 13, 2022], Available from the internet URL: https://www.amazon.com/dp/BOOMOV7VVI?th=1 (Year: 2014), 7 pgs.

Rooney, Andrew J.; Notice of Allowance for U.S. Appl. No. 29/774,174, filed Mar. 15, 2021, dated Oct. 12, 2022, 8 pgs.

\* cited by examiner

PET TRAINING HARNESS

CROSS-REFERENCE TO RELATED APPLICATIONS

This application claims the benefit of U.S. Provisional Application No. 63/003,652, filed on Apr. 1, 2020, which is hereby incorporated by reference in its entirety.

TECHNICAL FIELD

This disclosure relates to a pet harness. Specifically, this disclosure relates to a pet harness for training a pet to walk on a leash.

BACKGROUND

Many pet owners walk their pets, such as dogs, on leashes for a variety of reasons, including for exercise and so that the pets may relieve themselves. Some pets have a tendency to pull against the leash while walking. This can be annoying to pet owners who must fight their pets for control. Also, if the pet is wearing a collar, the pet often chokes itself, which can be distressing to the owner. There are some existing training devices, such as training collars, which rely upon adverse effects on the pet to discourage pulling. For example, choker collars cinch down around the pet's neck and cut off the pet's airways when the pet pulls against the leash. Other training collars employ metal spikes that dig into the pet's neck with the purpose of causing pain or discomfort to discourage pulling. Many pet owners find these means to be inhumane or ethically objectionable.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a harness assembly comprising a harness comprising a guide; and a control line extending through the guide, the control line capable of translating through the guide relative to the harness.

Also disclosed is a pet training assembly comprising a harness assembly comprising a harness comprising a guide; and a control line extending through the guide, the control line capable of translating through the guide relative to the harness, the control line defining a first end and a second end; a collar coupled to the first end; and a leash coupled to the second end.

Also disclosed is a method for using a pet training assembly to walk a pet, the method comprising fitting a harness of a harness assembly of the pet training assembly around the pet, the harness comprising a guide; coupling a first end of a control line of the harness assembly to a collar of the pet training assembly, the collar fitting around a neck of the pet, the control line extending through the guide; coupling a second end of the control line to a leash of the pet training assembly; and pulling the leash to pull a head of the pet downwards.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a pet training assembly and associated methods, systems, devices, and various apparatus. The pet training assembly can comprise a harness assembly, a collar, and a leash. It would be understood by one of skill in the art that the disclosed pet training assembly is described in but a few exemplary aspects among many. No particular terminology or description should be considered limiting on the disclosure or the scope of any claims issuing therefrom.

FIGS. 1-6 show a pet 150 wearing a pet training assembly 100 in accordance with one aspect of the present disclosure, and the pet training assembly 100 can comprise a harness assembly 108, a collar 190, and a leash 290. The collar 190 and the leash 290 can be well-known collars and leashes. FIGS. 7-14 show various views of the harness assembly 108 of the pet training assembly 100 of FIGS. 1-6. While the disclosure primarily discusses the pet training assembly 100 with respect to FIGS. 1-6, many of the elements and features identified and enumerated with respect to FIGS. 1-6 are also shown in FIGS. 7-14.

Figure 1:
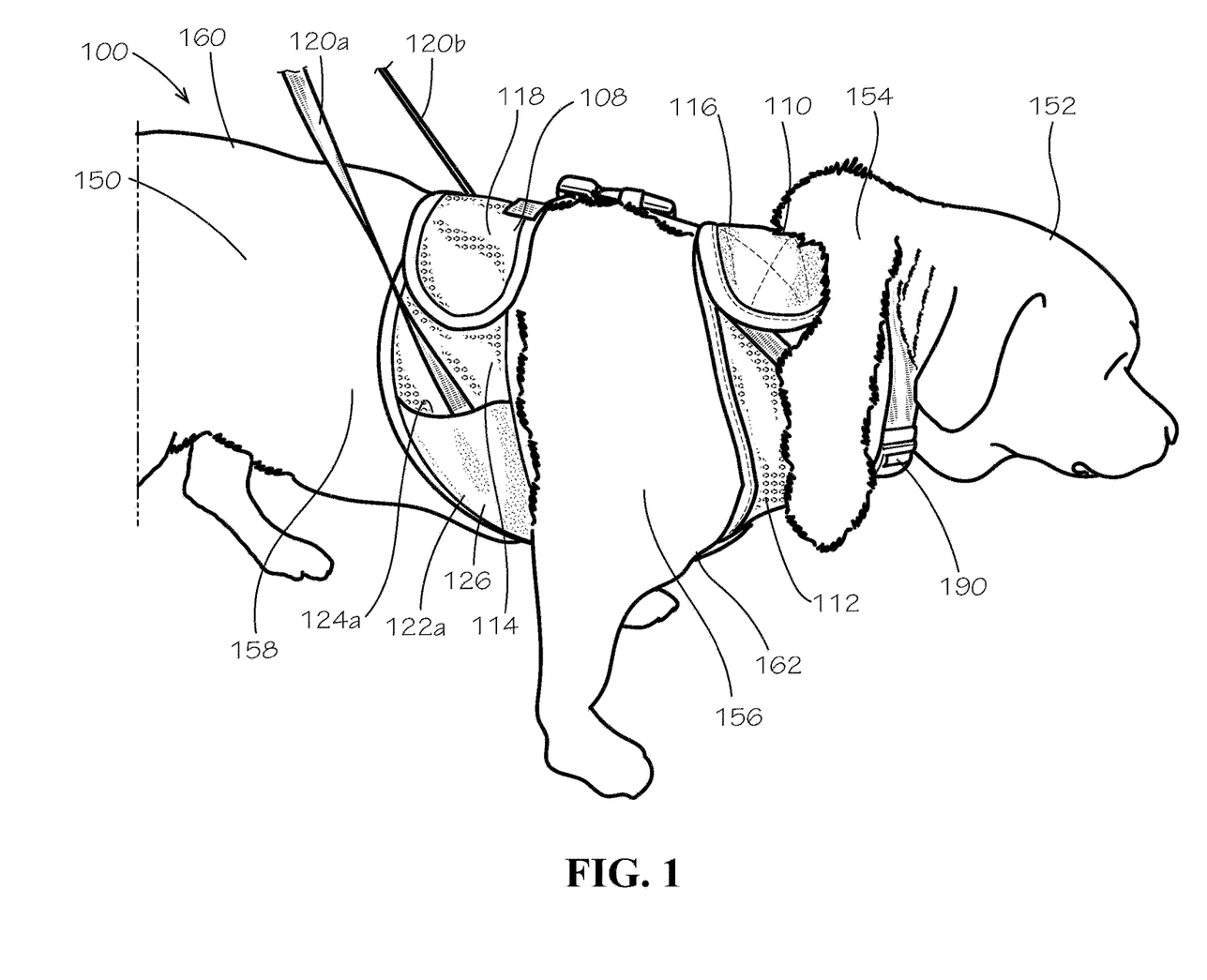
FIG. 1 is a perspective right side view of a pet wearing a pet training assembly comprising a harness assembly in accordance with one aspect of the present disclosure.
Figure 2:
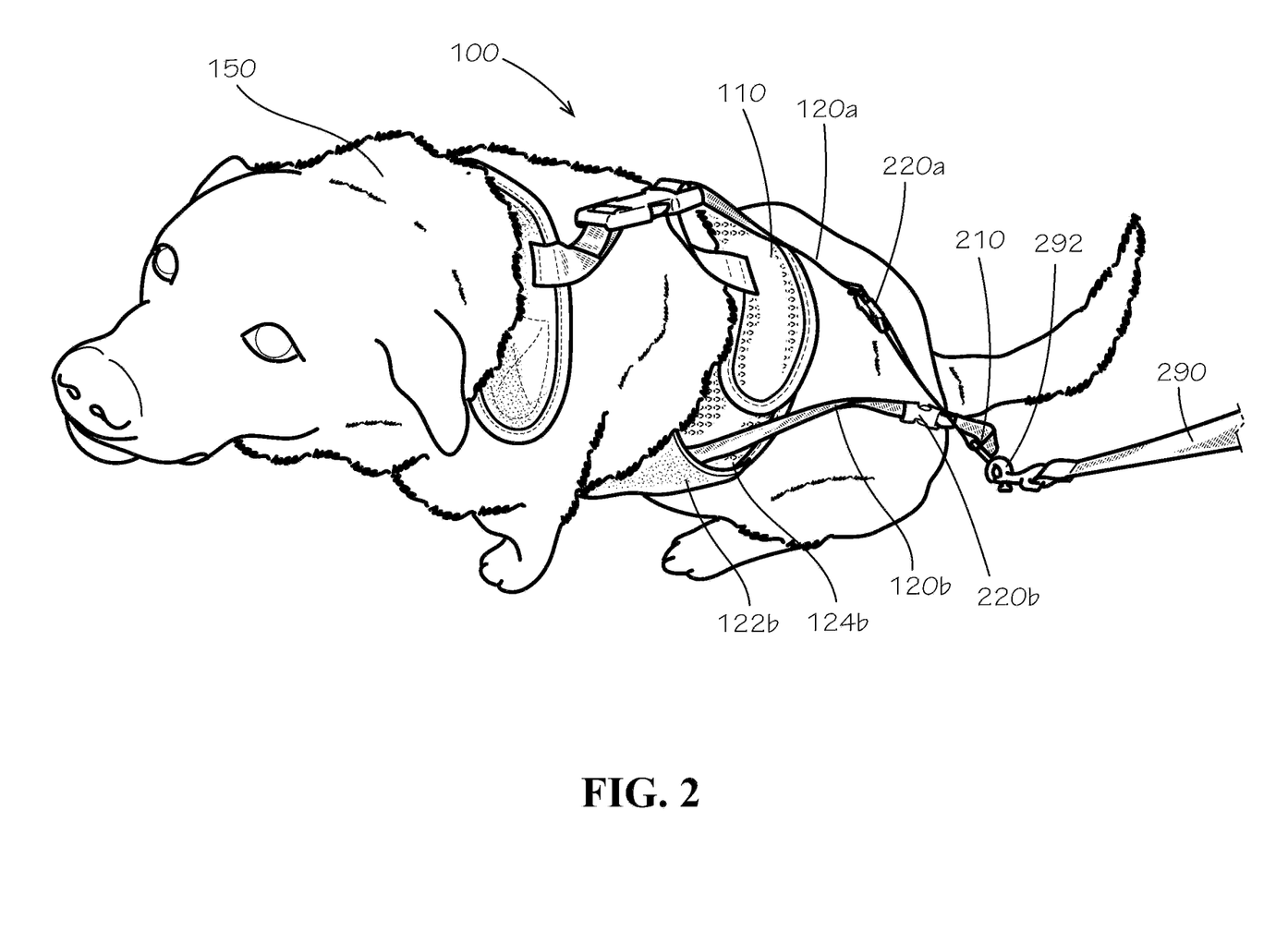
FIG. 2 is a perspective left side view of the pet wearing the pet training assembly of FIG. 1.

Turning to the individual drawings, FIG. 1 is a perspective right side view of the pet 150 wearing the pet training assembly 100, which can comprise the harness assembly 108, the collar 190, and the leash 290 (shown in FIG. 2). The collar 190 can fit around a neck 154 of the pet 150 behind a head 152 of the pet 150.

The harness assembly 108 can comprise a harness 110, a right control line 120a, and a left control line 120b. The harness 110 can comprise a front girth strap 112 and a rear girth strap 114. The front girth strap 112 can extend around the pet 150 in front of shoulders 156 of the pet 150 at an intersection of a neck 154 of the pet 150 and the shoulders 156. The rear girth strap 114 can extend around a ribcage 158 of the pet 150 behind the shoulders 156 of the pet 150. The front girth strap 112 can define a front fastening mechanism 116, and the rear girth strap 114 can define a rear fastening mechanism 118. The respective fastening mechanisms 116, 118 can secure the girth straps 112, 114 around the pet 150. In the present aspect, the fastening mechanism 116, 118 can be positioned along a back 160 of the pet 150. In other aspects, the fastening mechanisms 116, 118 can be positioned in different locations around the pet 150.

In the present aspect, the fastening mechanisms 116, 118 can comprise hook-and-loop fasteners 816, 818 (shown in FIG. 8); however, in other aspects, the fastening mechanisms 116, 118 can comprise a different type of fastener, such as snap buckles, ladder-lock buckles and straps, drawstrings, button snaps, belt-buckle-style prong-and-eyehole fasteners, laces, or any other suitable fastening mechanism. The respective fastening mechanisms 116, 118 can be circumferentially adjusted to snuggly fit the girth straps 112, 114 around the pet 150, or a different pet of larger or smaller size.

The harness 110 can further comprise a right guide 122a and a left guide 122b (shown in FIG. 2). The guides 122a,b can route the control lines 120a,b around the ribcage 158 of the pet 150 from the rear girth strap 114 to the front girth strap 112 along a chest 162 of the pet 150. In the present aspect, each guide 122a,b can respectively define a passageway 124a,b (124b shown in FIG. 2). In the present aspect, the guides 122a,b can comprise a piece of material 126, which can define the passageways 124a,b.

The passageways 124a,b can enclose the control lines 120a,b, which can prevent rubbing of the pet's 150 skin against the control lines 120a,b, for example and without limitation. In some aspects, the guides 122a,b may not enclose the control lines 120a,b. For example and without limitation, each guide 122a,b can respectively comprise a plurality of rings, loops, slots, or other guiding mechanisms, or a combination thereof, which can route the control lines 120a,b along the harness 110.

FIG. 2 is a perspective left side view of the pet 150 and the pet training assembly 100 of FIG. 1. The control lines 120a,b can be coupled together by a rear control line connector 210. In the present aspect, the control lines 120a,b can comprise a webbing material, which can be sewn to couple the control lines 120a,b to the rear control line connector 210. In other aspects, the control lines 120a,b, can comprise a different material such as a cord, string, wire, or other suitable material, and the control lines 120a,b, can be coupled to the rear control line connector 210 with a different mechanism, such as tying, crimping such as with a ferrule, riveting, or any other suitable method.

In the present aspect, each control line 120a,b can comprise a buckle 220a,b. The buckles 220a,b can be adjusted to shorten or lengthen the respective control lines 120a,b. In the present aspect, each buckle 220a,b can be a snap buckle, which can be used to disconnect the rear control line connector 210 from the remainder of the control lines 120a,b extending through the harness 110. Disconnecting the buckles 220a,b can permit removal of the control lines 120a,b from the harness 110, such as for cleaning, and disconnecting one or both buckles 220a,b can assist in removal of the harness assembly 108 from the pet 150.

The rear control line connector 210 can connect to a leash connector 292 of the leash 290. In other aspects, the leash 290 can be a proprietary leash with integral buckles configured to attach directly to the buckles 220a,b.

Figure 3:
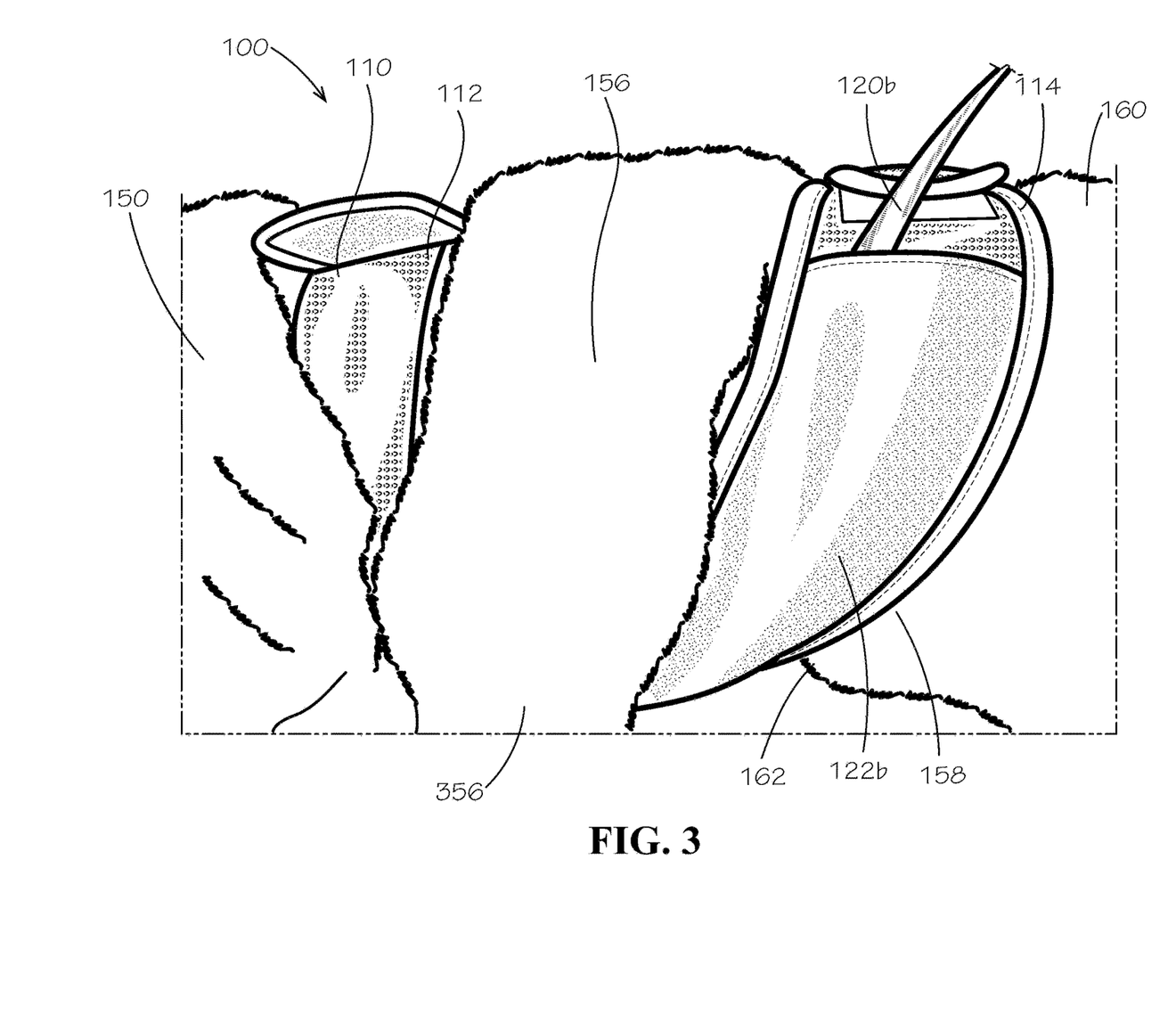
FIG. 3 is a detailed view of a shoulder of the pet wearing the pet training assembly of FIG. 1.

FIG. 3 is a detailed view of the shoulder 156 of the pet 150 wearing the pet training assembly 100 of FIG. 1, taken from the left side. As similarly discussed previously, the guide 122b can direct the control line 120b from the rear girth strap 114 behind the shoulder 156 of the pet 150 to the front girth strap 112 in front of the shoulder 156 of the pet 150. The guide 122b can route the control line 120b from near the back 160 of the pet 150 downwards around the ribcage 158 and between forelegs 356 of the pet 150 to the chest 162.

Figure 4:
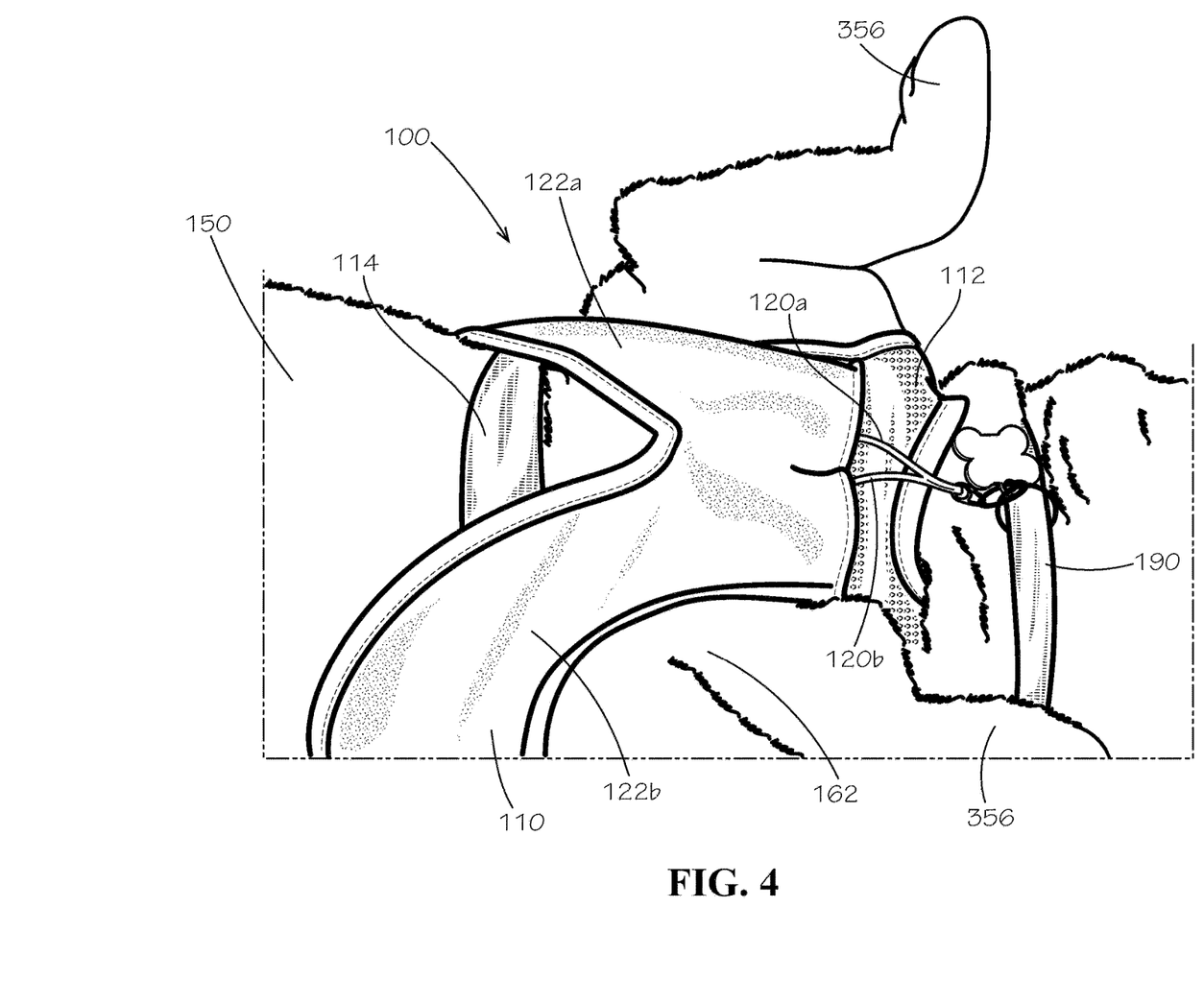
FIG. 4 is a detailed view of a chest of the pet wearing the pet training assembly of FIG. 1.

FIG. 4 is a detailed view of the chest 162 of the pet 150 wearing the pet training assembly 100 of FIG. 1. As shown, the guides 122a,b can direct the control lines 120a,b between the forelegs 356 of the pet 150 to the chest 162 of the pet 150. The control lines 120a,b can extend from the guides 122a,b at the front girth strap 112 to the collar 190.

Figure 5:
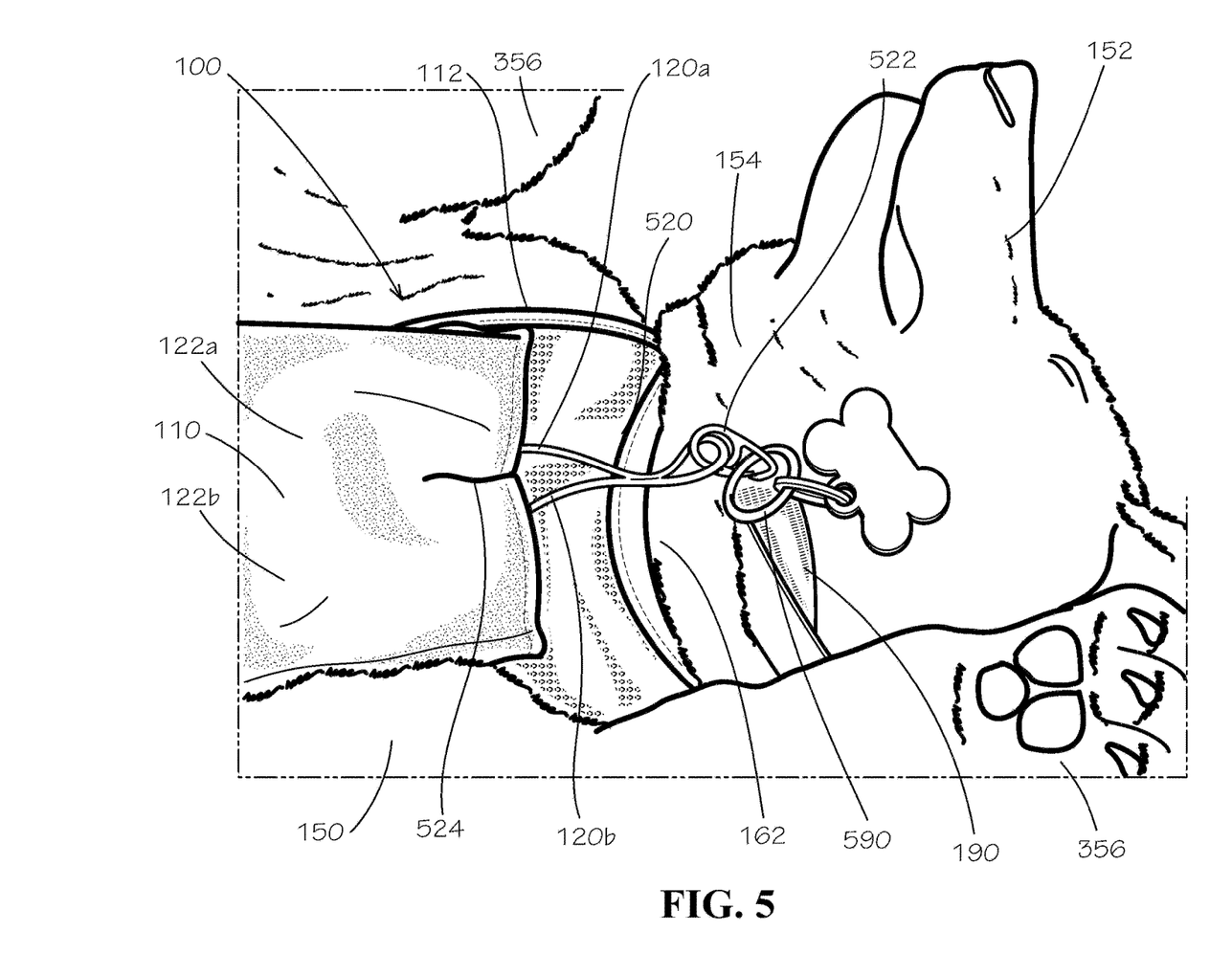
FIG. 5 is a detailed view of the chest and a neck of the pet wearing the pet training assembly of FIG. 1.

FIG. 5 is a detailed view of the chest 162 and the neck 154 of the pet 150 wearing the pet training assembly 100 of FIG. 1. Where the control lines 120a,b emerge from the guides 122a,b near the front girth strap 112, the control lines 120a,b can be coupled to a front control line connector 522. In the present aspect, the control lines 120a,b can be coupled together to define a joined portion 520, which can be coupled to the front control line connector 522. In the present aspect, a partition 524 can be positioned between the guides 122a,b so that coupling of both control lines 120a,b to the front control line connector 522 can prevent the control lines 120a,b from being pulled back through the guides 122a,b. The front control line connector 522 can be coupled to a collar connector 590 of the collar 190.

The harness 110 can be fixed to the pet 150 by the front girth strap 112 and the rear girth strap 114 (shown in FIG. 4), thereby preventing significant movement of the harness 110 relative to the pet 150. The rear control line connector 210 (shown in FIG. 2) and the front control line connector 522 can couple the control lines 120a,b together to form a loop in the present aspect. In other aspects, each control line 120a,b can comprise an individual, rather than common, rear control line connector 210 and/or front control line connector 522. Except as constrained by the rear control line connector 210 and the front control line connector 522, the control lines 120a,b can freely translate forward and rearward through the guides 122a,b relative to the harness 110, as well as the pet 150 wearing the harness 110.

In use, when tension is exerted upon the leash 290 (shown in FIG. 2), either by a user pulling on the leash 290 against the pet 150 or the pet 150 pulling on the leash against the user, this tension is transferred through the control lines 120a,b to the collar 190. Unlike a typical leash which extends upwards under tension from the collar 190 to a user's hand (usually above the pet), here the control lines 120a,b extend from the collar 190 down to the chest 162 of the pet 150. This routing causes tension in the leash 290 and control lines 120a,b to exert a downward force on the neck 154 of the pet 150 through the collar 190, thereby pulling the head 152 of the pet 150 downwards towards the ground. This downward force can dissuade the pet 150 from pulling on the leash 290 or resisting a user's pull upon the leash 290, such as to redirect the pet 150. Through practice utilizing the pet training assembly 100, the pet 150 can be trained not to pull against the leash 290, even if the pet 150 is later walked without wearing the harness assembly 108.

Additionally, the downward force exerted on the neck 154 of the pet 150 can effectively prevent the pet 150 from jumping up, such as on passersby. With a normal leash, when a pet 150 jumps upward, the user frequently pulls on the leash, which can counterproductively pull the pet 150 upwards. By contrast, with the pet training assembly 100, pulling upon the leash 290 can exert downward force on the neck 154 of the pet 150 through the control lines 120a,b that can resist the pet 150 in jumping up. Through practice utilizing the pet training assembly 100, the pet 150 can be trained not to jump up on people as well.

Figure 6:
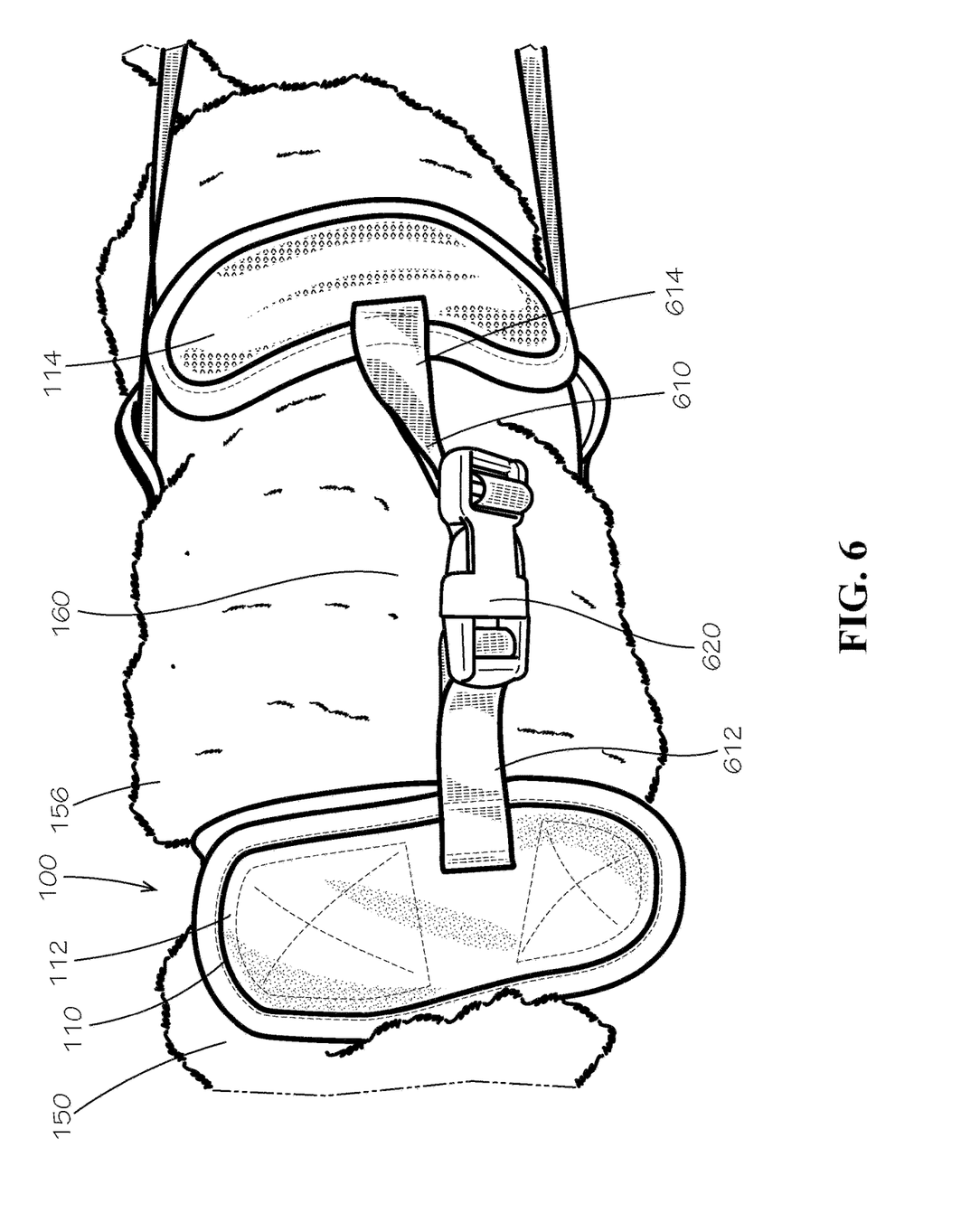
FIG. 6 is a top view of the pet wearing the pet training assembly of FIG. 1.
Figure 7:
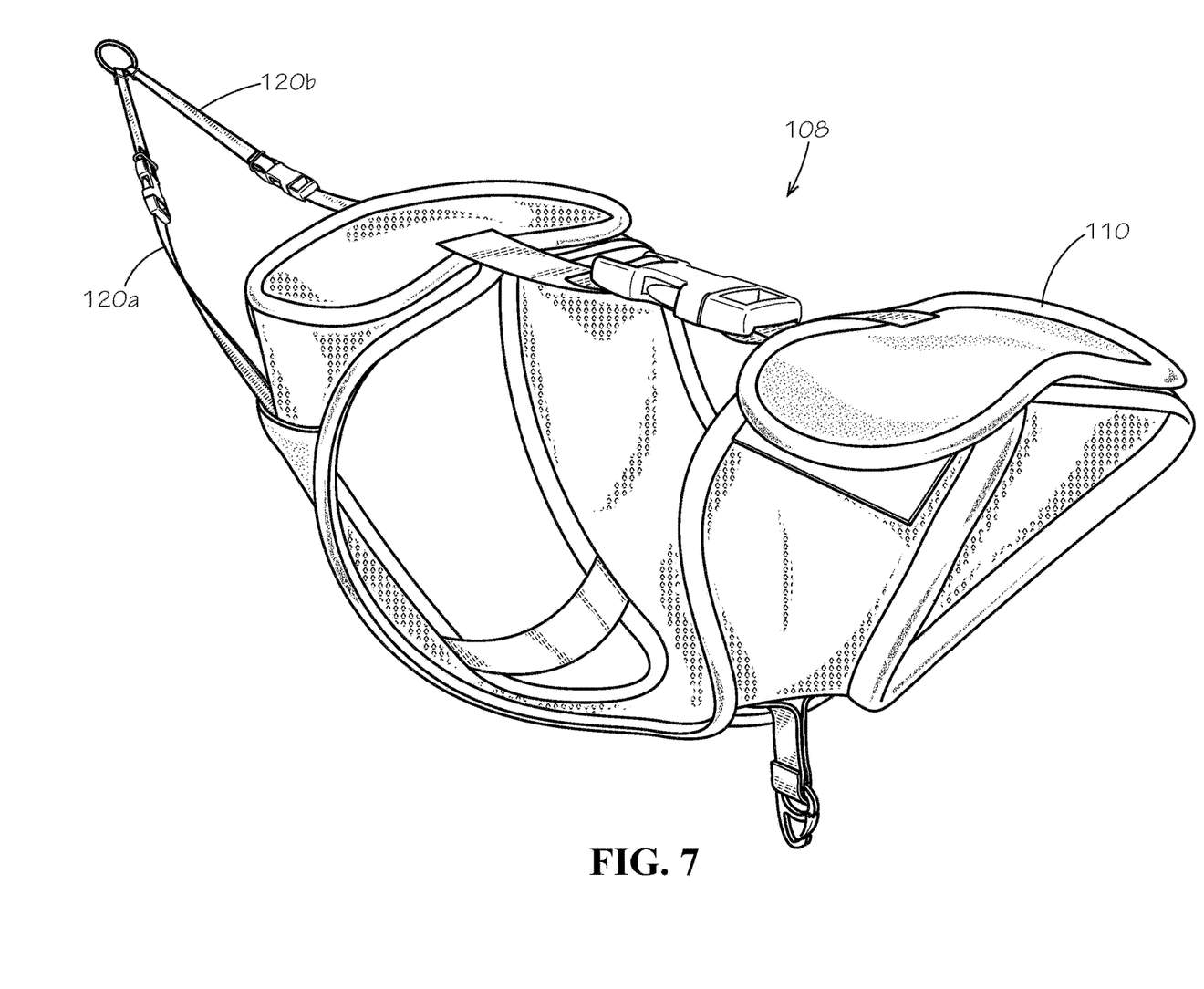
FIG. 7 is a downward perspective view of the harness assembly of the pet training assembly of FIG. 1.
Figure 8:
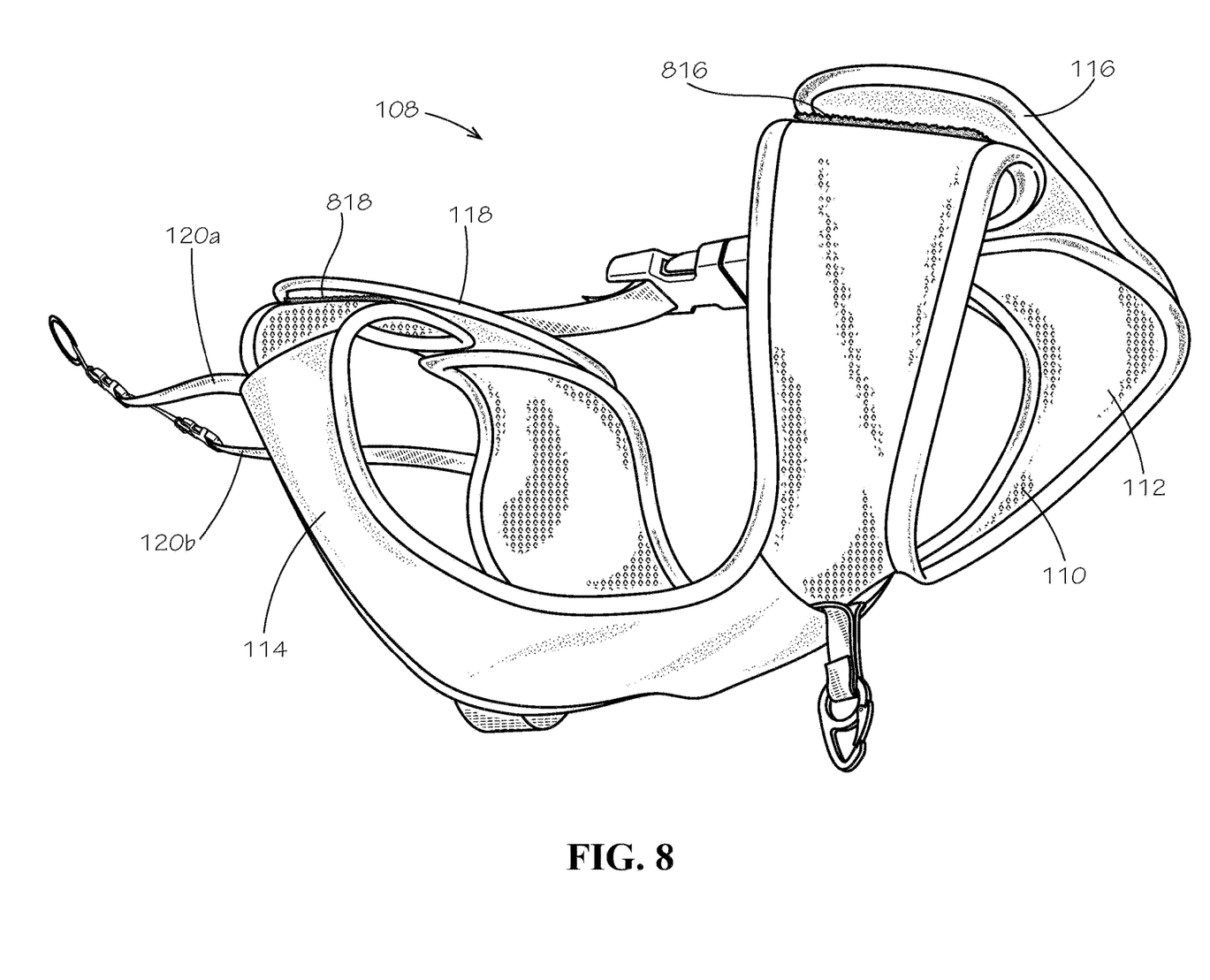
FIG. 8 is an upward perspective view of the harness assembly of the pet training assembly of FIG. 1.
Figure 9:
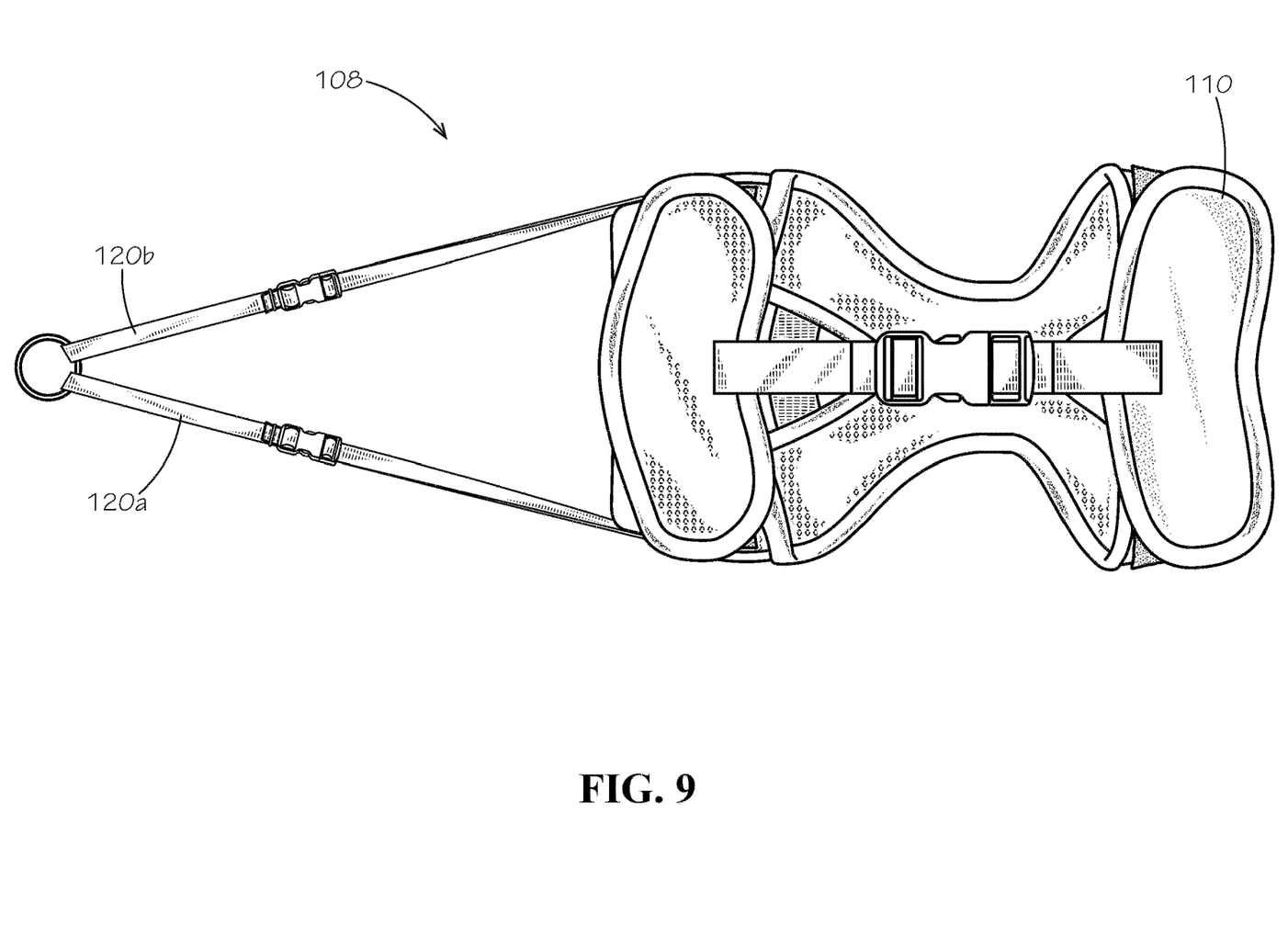
FIG. 9 is a top view of the harness assembly of the pet training assembly of FIG. 1.
Figure 10:
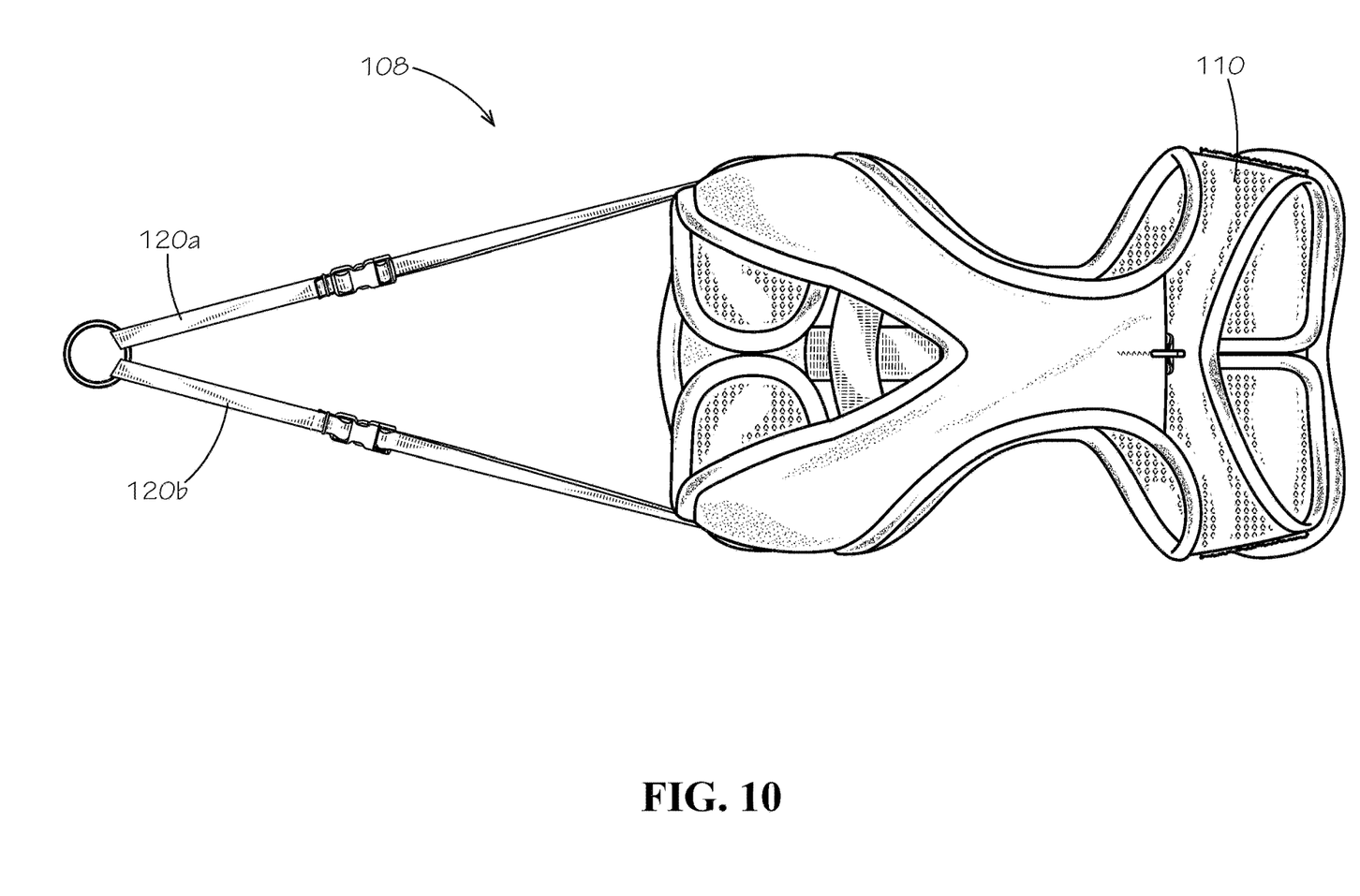
FIG. 10 is a bottom view of the harness assembly of the pet training assembly of FIG. 1.
Figure 11:
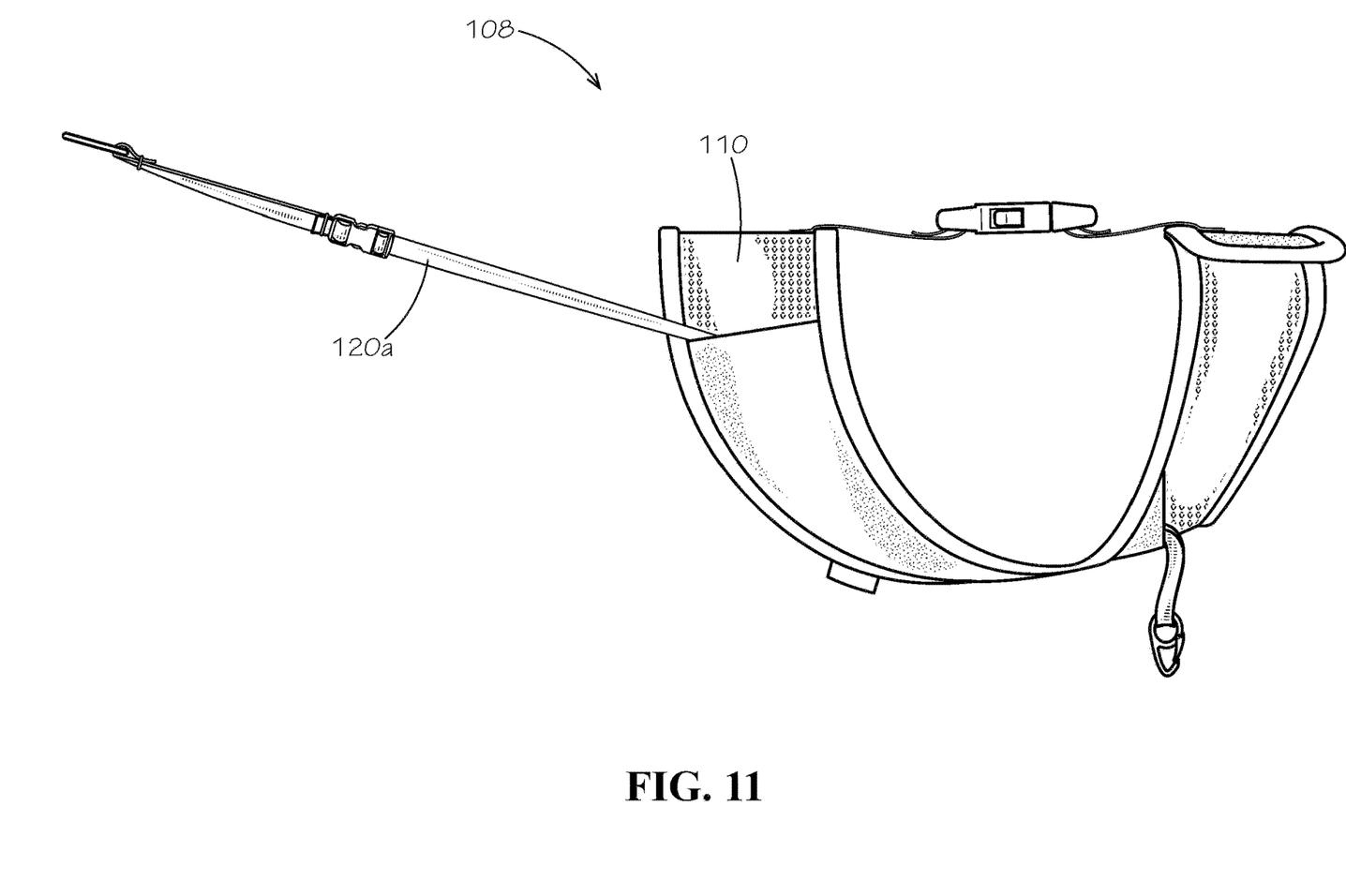
FIG. 11 is a right-side view of the harness assembly of the pet training assembly of FIG. 1.
Figure 12:
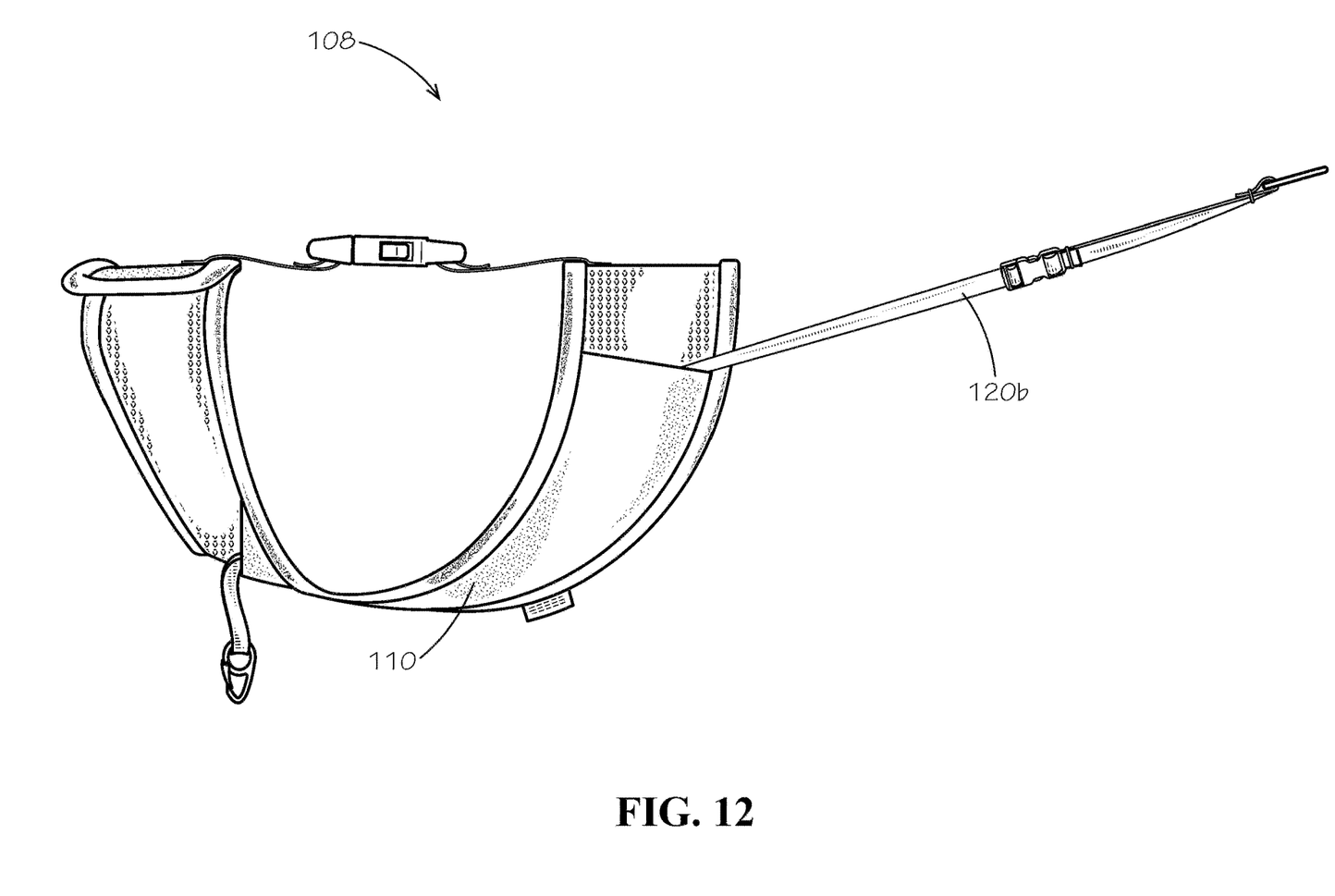
FIG. 12 is a left-side view of the harness assembly of the pet training assembly of FIG. 1.
Figure 13:
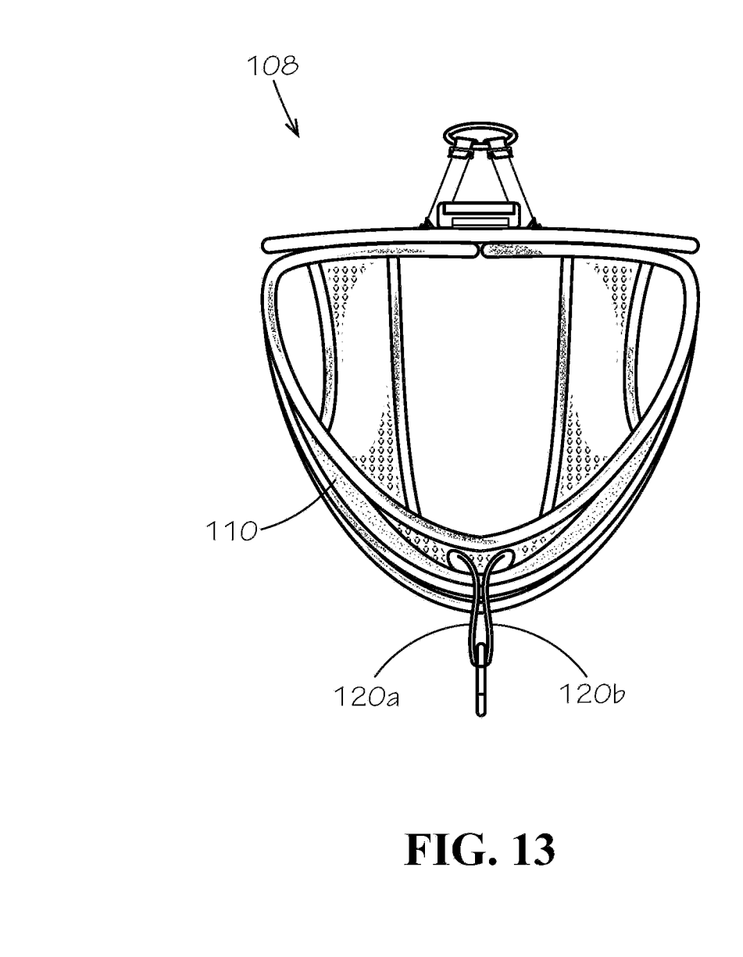
FIG. 13 is a front view of the harness assembly of the pet training assembly of FIG. 1.
Figure 14:
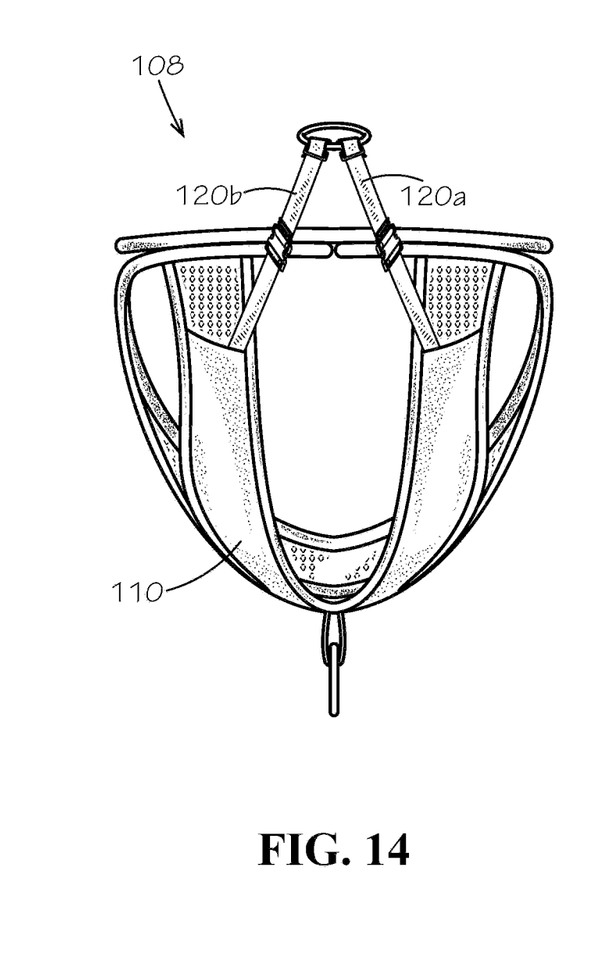
FIG. 14 is a rear view of the harness assembly of the pet training assembly of FIG. 1.

FIG. 6 is a top view of the pet 150 wearing the pet training assembly 100 of FIG. 1. The harness 110 can further comprise a back strap 610. The back strap 610 can extend along the back 160 of the pet 150. A front back strap portion 612 of the back strap 610 can be coupled to the front girth strap 112, and a rear back strap portion 614 of the back strap 610 can be coupled to the rear girth strap 114. The back strap 610 can further comprise a back strap connector 620, which can selectively couple and release the front back strap portion 612 and the rear back strap portion 614. In the present aspect, the back strap connector 620 can be a snap buckle; however, in other aspects, the back strap connector 620 can be a different type of connector. The back strap connector 620 can facilitate in putting on and taking off the harness 110 from the pet 150.

The back strap 610 can also be adjusted for length. In the present aspect, the back strap connector 620 can adjust the back strap 610 for length; however, in other aspects, the back strap 610 can be adjusted in another way. For example, either or both of the back strap portions 612, 614 can couple to the respective girth strap 112, 114 through an adjustable mechanism, such as a ladder lock buckle, for example and without limitation. Adjustment of the back strap 610 can increase security of the harness 110 on the pet 150 and prevent slipping of the harness 110 relative to the pet 150 by positioning the front girth strap 112 and the rear girth strap 114 snuggly on either side of the shoulders 156 of the pet 150.

In the aspects shown, the pet 150 can be a dog; however, the pet training assembly 100 can be used with other types of pets, including cats, pigs, rabbits, goats, monkeys, sheep, or other animals, for example and without limitation.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A harness assembly comprising:
    a harness comprising:
        a front girth strap defining a front fastening mechanism securing the front girth strap;
        a rear girth strap defining a rea r fastening mechanism securing the rear girth strap; and
        a guide defining a partition coupled to the harness and positioned between a first passageway and a second passageway;
    a control line extending from a rear control line connector to a front control line connector and defining a first portion extending through the first passageway and a second portion extending through the second passageway of the guide from the rear girth strap to the front girth strap, the control line capable of translating through the guide relative to the harness
    the first passageway is a right passageway, and the second passageway further comprises a left passageway;
    the guide is a right guide and the harness further comprises a left guide;
    the right passageway extends from the rear girth strap to the front girth strap of the right guide; and
    the left passageway extends from the rear girth strap to the front girth strap of the left guide.

2. The harness assembly of claim 1, wherein:
    the front girth strap is configured to fit around a pet in front of a pair of shoulders of the pet;
    the rear girth strap is configured to fit around the pet behind the pair of shoulders of the pet; and
    the guide extends from the rear girth strap to the front girth strap.

3. The harness assembly of claim 1, wherein the harness further comprises a back strap coupled to the front girth strap and the rear girth strap.

4. The harness assembly of claim 1, wherein:
    the front control line connector is configured to couple to a collar; and
    the rear control line connector is configured to couple to a leash.

5. The harness assembly of claim 1, wherein:
    the control line extends through the first passageway and the second passageway; and
    the first passageway and the second passageway at least partially enclose the control line.

6. The harness assembly of claim 1, wherein:
    the guide is a left guide;
    the harness further comprises a right guide;
    the control line is a left control line; and
    the harness assembly further comprises a right control line extending through the right guide.

7. The harness assembly of claim 6, wherein:
    the left guide and the right guide are each coupled to the front control line connector; and
    the left guide and the right guide are each coupled to the rear control line connector.

8. The harness assembly of claim 1, wherein:
    the front girth strap defines and extends from a top to a bottom;
    the rear girth strap defines and extends from a top to a bottom;
    the rear control line connector of the control line is positioned above the top of the rear girth strap; and
    the front control line connector of the control line is positioned at or below the bottom of the front girth strap.

9. The harness assembly of claim 1, wherein the first portion of the control line is disconnected from the harness and enclosed in the first passageway extending from the rear girth strap to the front girth strap, and the second portion of the control line is disconnected from the harness and enclosed in the second passageway extending from the rear girth strap to the front girth strap.

10. The harness assembly of claim 1, wherein the control line and a portion of the harness are adapted to extend around one or more front legs of a pet, and the front control line connector is coupled to a collar connector coupled to a collar on the pet.

11. The harness assembly of claim 1, wherein the partition is sewn into the guide to couple the guide to the harness.

12. The harness assembly of claim 1, wherein the first portion and the second portion of the control line are attached at a joined portion coupled to the front control line connector.

13. A pet training assembly comprising:
    a harness assembly comprising:
        a harness comprising a front girth strap defining a front fastening mechanism securing the front girth strap, a rear girth strap defining a rear girth fastening mechanism securing the rear girth strap, and a guide defining a partition coupled to the harness positioned between a first passageway and a second passageway of the harness; and a control line extending from a rear control line connector to a front control line connector and defining a first portion extending through the first passageway and a second portion extending through the second passageway of the guide from the rear girth strap to the front girth strap, the control line capable of translating through the first passageway and the second passageway of the guide relative to the harness;

a collar coupled to the front control line connector;
a leash coupled to the rear control line connector
the guide is a left guide;
the harness further comprises a right guide;
the control line is a left control line;
the harness assembly further comprises a right control line extending through the right guide;
the first passageway extends from the rear girth strap to the front girth strap of the right guide; and
the second passageway extends from the rear girth strap to the front girth strap of the left guide.

14. The pet training assembly of claim 13, wherein: the right control line is coupled to the collar and the leash.

15. The pet training assembly of claim 14, wherein the harness is configured to be secured to a pet, and wherein the left guide and the right guide are configured to route the left control line through the first passageway and the right control line through the second passageway of the guide from the rear girth strap behind a pair of front legs of the pet to the front girth strap in front of the pair of front legs of the pet.

16. The pet training assembly of claim 14, wherein:
a first end of the right control line is coupled to the first end of the left control line; and
a second end of the right control line is coupled to the second end of the left control line.

17. The pet training assembly of claim 13, wherein the front girth strap is circumferentially adjustable.

18. A method for using a pet training assembly to walk a pet, the method comprising:
fitting a harness of a harness assembly of the pet training assembly a round the pet, the harness comprising a front girth strap defining a front fastening mechanism securing the front girth strap, a rear girth strap defining a rear fastening mechanism securing the rear girth strap, and a guide defining a partition coupled to the harness and positioned between a first passageway and a second passageway;

coupling a control line of the harness assembly to a collar of the pet training assembly, the collar fitting around a neck of the pet, the control line extending from a rear control line connector to a front control line connector and defining a first portion extending through the first passageway and a second portion extending through the second passageway of the guide from the rear girth strap to the front girth strap, and coupling the front control line connector of the control line to the collar;

coupling the rear control line connector of the control line to a leash of the pet training assembly;

pulling the leash to pull a head of the pet downwards the first passageway is a right passageway, and the second passageway further comprises a left passageway;

the guide is a right guide and the harness further comprises a left guide;

the right passageway extends from the rear girth strap to the front girth strap of the right guide; and the left passageway extends from the rear girth strap to the front girth strap of the left guide.

19. The method of claim 18, wherein pulling the leash to pull the head of the pet downwards comprises translating the control line through the guide of the harness.

20. The method of claim 18, wherein the guide routes the control line between a pair of front legs of the pet.

21. The method of claim 18, wherein:
the front girth strap and the rear girth strap each extend around the pet; and
a pair of shoulders of the pet are positioned between the front girth strap and the rear girth strap.

22. The method of claim 18, further comprising circumferentially adjusting the rear girth strap to snuggly fit the pet.

23. The method of claim 18, wherein:
the guide is a left guide;
the harness further comprises a right guide;
the control line is a left control line;
the harness assembly further comprises a right control line extending through the right guide; and
the right control line is coupled to the collar and the leash.

\* \* \* \* \*